Dec. 27, 1955   V. GUILLEMIN, JR   2,728,337
DIAGNOSTIC APPARATUS
Filed Sept. 25, 1951   2 Sheets-Sheet 1
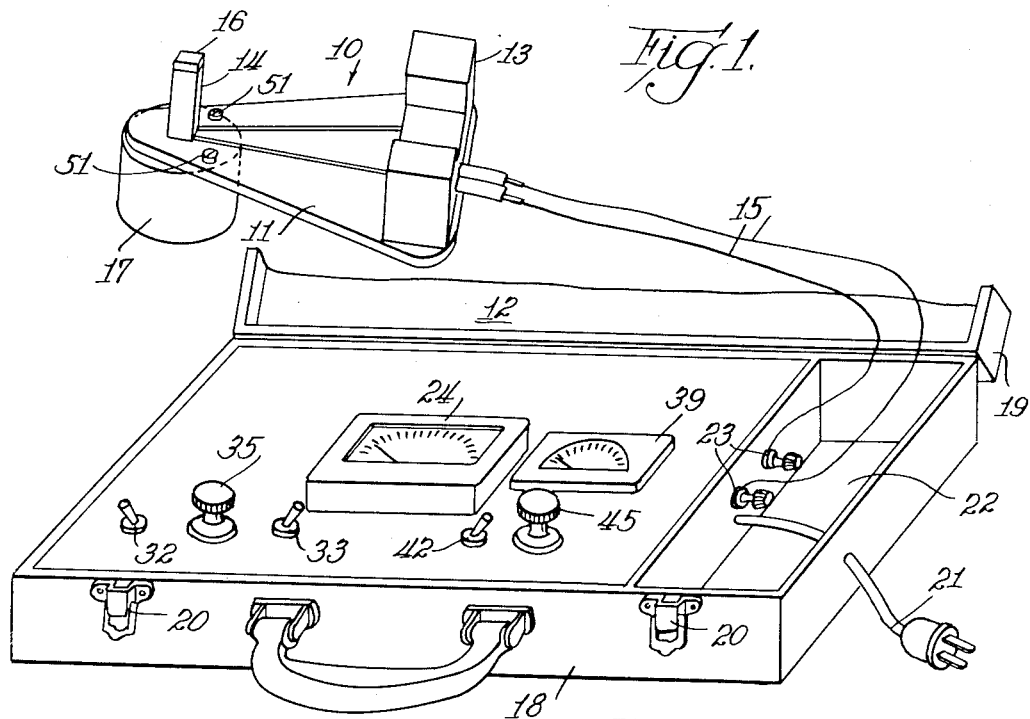
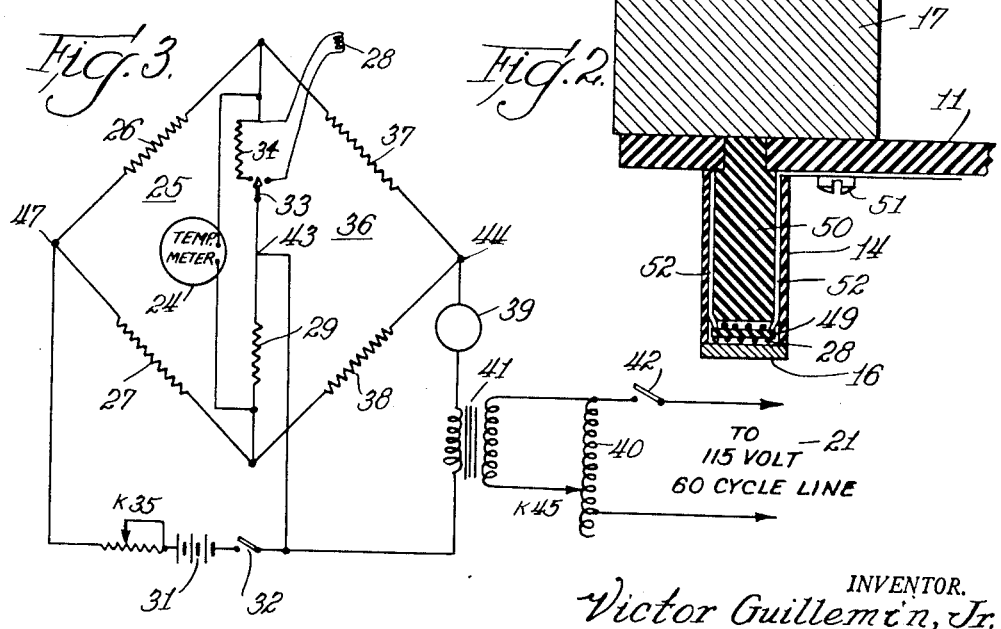
INVENTOR.
Victor Guillemin, Jr.

Dec. 27, 1955  V. GUILLEMIN, JR  2,728,337
DIAGNOSTIC APPARATUS
Filed Sept. 25, 1951  2 Sheets-Sheet 2
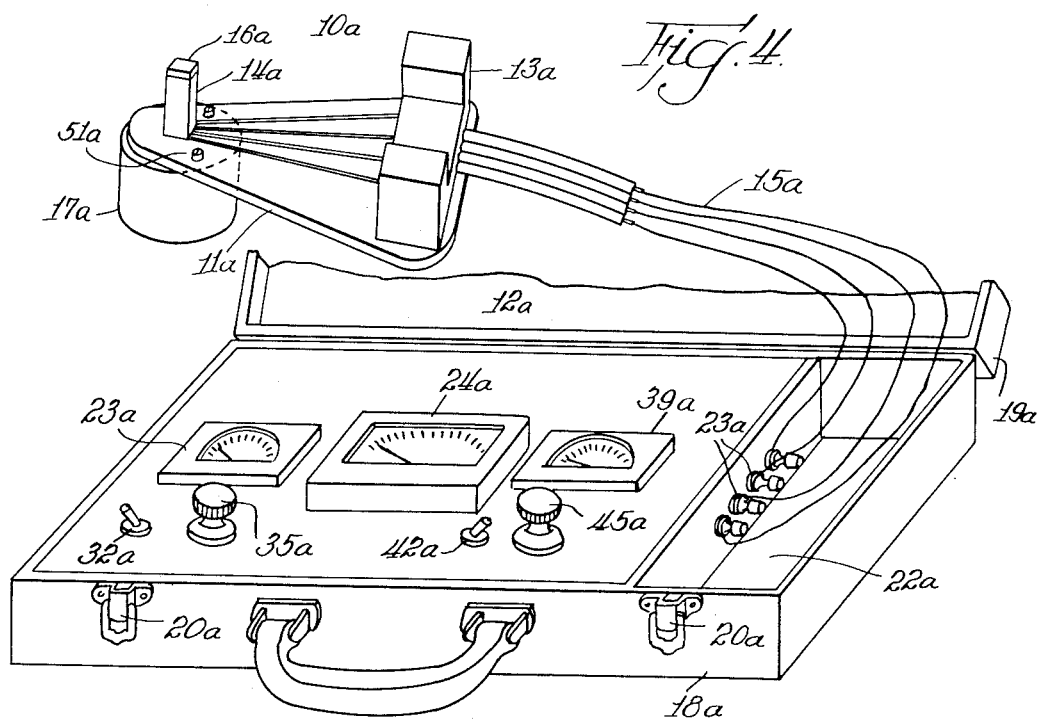
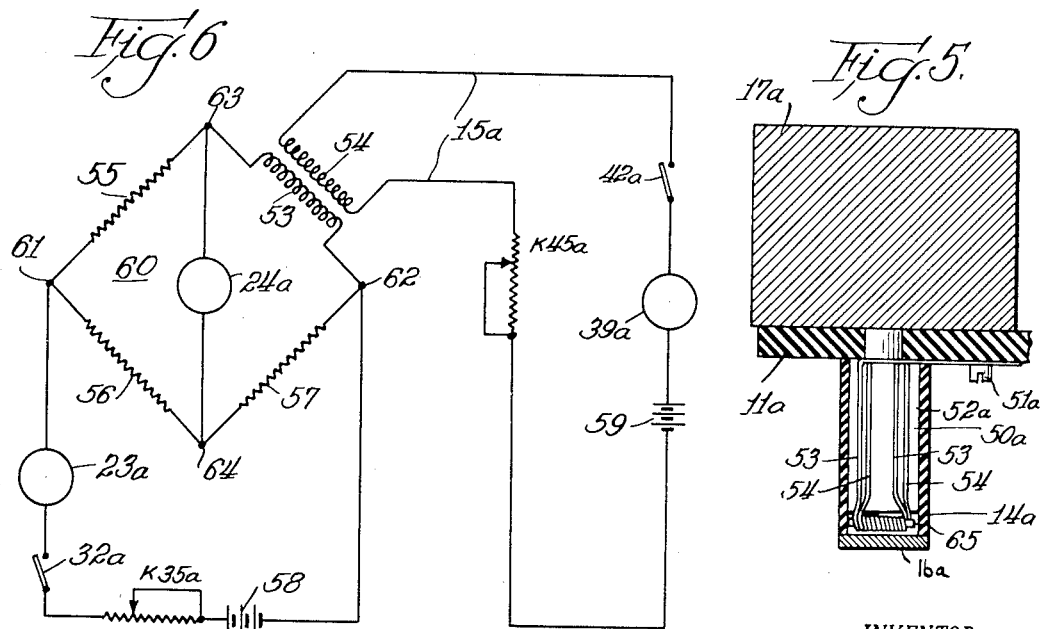
INVENTOR.
Victor Guillemin, Jr.

United States Patent Office 2,728,337
Patented Dec. 27, 1955

2,728,337

DIAGNOSTIC APPARATUS

Victor Guillemin, Jr., Oak Park, Ill., assignor to Lakeland Foundation, Chicago, Ill., a corporation of Illinois Application September 25, 1951, Serial No. 248,118

19 Claims. (Cl. 128—2)

This invention relates in particular to diagnostic apparatus, and particularly to diagnostic apparatus for use in applying controlled measured heat quantities to point areas of skin for testing purposes.

The determination of various basic physiological differences in reaction of normals and unnormals in any control test is a step forward in the achievement of useful information with which to combat the unnormal condition. Not infrequently the application of a noxious agent in tests of normal and unnormal conditions or subjects provides a means for obtaining such information, and the apparatus of the present invention is directed to a novel applicator which is specifically useful in determinations of this general type.

The apparatus of the invention is specifically adapted to provide controlled amounts of a noxious agent, such as heat, in closely measured variable gradients and predetermined adjustable pressures to small dimensional areas. The use of the novel apparatus in various types of heat stimulation tests will become immediately apparent to parties in the medical field, one particular use being set forth hereat in conjunction with the copending application which was filed by Andrew C. Joy and Fred B. Benjamin on September 25, 1951, received Serial No. 248,168 and which was assigned to the assignee of this invention, and is now abandoned.

The copending application teaches several novel methods which are aids to the determination of the existence or non-existence of malignant diseases, and it is a specific object of the present invention to provide novel improved apparatus for use with the novel methods taught therein.

The apparatus of the present invention is further directed to an improved type of unit for use in connection with the application of heat in graduated controlled amounts and at given pressures to small areas of the skin.

As indicated in the copending application, in certain methods of diagnosis a flare area of 15 mm. is considered a proper response and the heat applicator used in the tests must therefore be of a comparatively small size. Known types of apparatus used in the heat stimulation of the human skin however are not so constructed and serious problems are encountered in the provision thereof. For example, the temperature of a probe which applies heat to a small skin area must be constant over the whole surface of contact therewith to insure consistent and accurate skin response, and the provision of a uniformly dispersing heat member of these small dimensions is extremely difficult. Further, the temperature sensing element which determines the value of heat applied to the skin should indicate the true temperature of the probe surface if a high degree of accuracy is to be continually afforded, and the inclusion of both a temperature sensing element and a heater unit in the small area allotted provides many complications.

The heat capacity of the probe must also be as low as possible, for failing this requirement great difficulty will be experienced in the rapid adjustment and variation of temperature which is necessarily effected in the use of the desirable methods set forth in the copending application.

There is therefore a definite need in the medical field for an improved type of heat applicator and the provision of an instrument including a small probe having each of these requirements and qualifications is the primary object of this invention.

The successful apparatus should have both heater and measuring means which are located in the heater applicator. Further, the measuring means must be capable of operating a direct reading indicator rather than requiring a search for the temperature, as for example, by balancing a potentiometer. Failing an arrangement in which such instantaneous readings are obtainable, the added time required to balance the instrument might well be sufficient to alter the accuracy of the test. This is especially true in the methods described in the copending application in which the temperature must frequently be varied rapidly, or adjustments must be made to compensate for fluctuation of temperature or heat flow in the subject. It is a further object of the invention to provide apparatus in which such direct type readings are obtainable.

These and other objects and features of the invention will become more apparent now with reference to the following specification and drawings in which:

Figure 1 is a perspective view of the control apparatus in one embodiment and an associated heat applicator unit, the arrangement there shown being energized by both an alternating current and direct current source;

Figure 2 is a cross sectional view of the novel heat applicator unit of Figure 1;

Figure 3 is a schematic illustration of the energizing source for the control apparatus of Figure 1;

Figure 4 is a perspective view of a second embodiment of the apparatus of the invention in which the power supply for the unit is a direct current self-contained source;

Figure 5 is a cross section of the heat applicator unit for use with the apparatus of Figure 4; and Figure 6 is a schematic sketch of the power supply circuit for the control apparatus of Figure 4.

Two embodiments of the apparatus are set forth in the following disclosure, a first embodiment being illustrated perspectively in Figure 1 and a second embodiment being illustrated in Figure 4. Members in the second embodiment which are similar to that of the first embodiment are identified by like numerals followed by the letter *a*. The apparatus in each embodiment basically comprises a heat applicator unit 10 and control apparatus 12 for controlling energization of the applicator unit 10 from a given power source or sources.

In each embodiment the heat applicator unit 10 comprises a triangular "lucite" support member 11 having a foot member 13 attached to the base end thereof and a probe member 14 attached to the apex thereof. The foot member 13 cooperates with the "lucite" triangular support 11 to form a firm, convenient holding means as an aid to stabilization in use thereof and also forms an insulated strain relief mounting for the flexible conductors, such as 15, which extend between the control apparatus 12 and the probe unit 14, the conductors 15 being moulded within the support 11 and the foot member 13 to form an integral part thereof. A pair of fasteners 51 are attached to the upper side of the support 11 at the apex end thereof to support a weight member, such as the illustrated member 17. With the mounting of various size weights on the members 51 a corresponding variation of the applied pressure during use is afforded.

The probe unit 14 in each of the illustrated embodiments comprises a housing approximately 16 sq. mm. in area which has its bottom or base 16 adapted for contact with the skin of the subject to be tested. The outer probe casing is approximately 7/16 inch high and houses therewithin a heater and a temperature sensing element. The construction of the heater and temperature sensing element in each of the illustrated embodiments is different.

In the first embodiment a single heating and temperature sensing element 28 (Fig. 2) comprising a single small winding of electric resistance wire of a metal having high temperature coefficient of resistance, such as nickel is mounted in closed contact with the base portion 16. In the second embodiment a double winding is utilized, one of which is energized to provide instantaneous variation in the value of heat supplied and the other of which provides instantaneous indications of the temperature changes thereat.

The outward physical characteristics of both embodiments of the control apparatus 12, 12a are also similar and accordingly like numerals have been utilized to indicate like members in Figures 1 and 4. The control apparatus 12, 12a are adapted to provide closely regulated control of the intensity of heat which is provided to the applicators 10, 10a during the tests as well as instantaneous indications of the temperature variations thereof. As shown in Figures 1 and 4 the control apparatus 12, 12a is housed in a portable case 18, 18a having a hinged cover 19, 19a which when latched in place by suitable clasp means 20, 20a provides protection for the face of the equipment to permit the convenient portage thereof. A small compartment 22, 22a on the right hand side of the case provides housing space for the applicator 10, 10a and the associated conductors 15, 15a which interconnect same to the control apparatus. Terminal members 23, 23a mounted on one wall of the compartment provide suitable means for connecting the conductors 15 to the apparatus 12, 12a. In the case of the first embodiment (Fig. 1) two conductors 15 extend between the applicator 10 and the control apparatus 12, and in the second embodiment (Fig. 4) four conductors 15a extend between the applicator 10a and the control apparatus 12a.

Control knobs on the apparatus in each embodiment comprise a first on-off switch 42, 42a for controlling connection of an energizing circuit to the heater equipment and a second on-off switch 32, 32a for controlling connection of an energizing source to the temperature indicating means of the apparatus. A first control knob 45, 45a is adjustable to various positions to vary the value of current supplied to the heater member, and a second knob 35, 35a is adjustable to various positions to vary the value of current supplied to the temperature indicating arrangement. In the embodiment of Figure 1 a two position calibrating switch 33 is also provided for at times connecting the sensing winding of applicator 10 to the control apparatus, and other times substituting a calibrating resistance 34 therefor. The embodiment of Figure 4 does not include a calibrating switch such as 33.

The D. C. unit of Fig. 4 has three indicating meters including a first or calibrating meter 23a, a second or temperature indicating meter 24a, and a third or energy indicator meter 39a. The A. C.–D. C. unit of Fig. 1 has two indicating meters only; that is, temperature indicating meter 24 and an energy indicator meter 39.

The first embodiment of the invention is adapted to be energized by a combination A. C.–D. C. energizing source, a standard connecting plug and cord set 21 being provided for connection thereof to a conventional source of 110 A. C.—60 cycle power. The second embodiment is adapted to be energized solely from a self-contained D. C. operating source and accordingly does not include the conventional plug set.

Auxiliary knobs and associated resistances may be supplied in each of the circuits in an obvious manner to provide a finer degree of adjustment when such is found desirable.

The operating circuits and details of construction of the probe units 14, 14a in the two embodiments are somewhat different and accordingly will be considered separately at this point.

With reference to Figure 2, there is shown thereat a cross section of the probe 14 and the specific manner in which the single resistance wire 28 is mounted within the probe 14 to provide equal distribution of heat over the base contact surface 16 of the probe member in the desired manner and an accurate indication of the temperatures of the skin contact face thereof.

In the embodiment there shown the winding comprises a layer of fine wire 28 (.003") wound on a .005" metal plate 49 approximately 3/16" square, the wound construction being disposed in close contact with the inner surface of the lower face 16 of the probe member. The whole winding assembly is mounted on the end of a 0.125 diameter "bakelite" rod 50 which extends upwardly and through the attached "lucite" support 11. Two longitudinal grooves 52 carry the two copper lead wires 15 which are soldered to the heating-thermometer winding 28 and extend to the control apparatus 12. The protective base cover plate 16 is made of 0.001 inch nickel steel and is insulated from the winding 28 by a thickness of .005 inch varnish. The whole element is baked under pressure to reduce the thermal flow resistance between the heating wire and the surface of the nickel cover to a minimum. The probe unit thus constructed is of a low heat capacity and effects accurate application of heat values under known conditions to point areas of skin in an accurate and reliable manner.

Essential to the successful conducting of most physiological tests is a heat applicator in which the heat output of the applicator may be quickly and instantaneously adjusted to a new and desired value and an indicating arrangement which provides instantaneous indicating of these changes.

An arrangement having these features is effected in the first embodiment by the provision of equipment in which two currents are passed simultaneously through the single heater-thermometer element 28, a constant direct current being supplied for temperature measuring purposes and a variable alternating current being supplied for heating purposes. The control circuit for such arrangement is specifically shown in Figure 3 and as there illustrated comprises a direct current Wheatstone bridge 25 and an alternating current Wheatstone bridge 36 in which a single heater temperature resistance wire 28 forms one arm of each of the bridges 25 and 36 and a balancing calibrated resistor 29 comprises the opposite arm of these bridges, the value of the balancing resistor 29 being adjusted to be equal to that of the heater thermometer winding 28 at any one given temperature.

Two currents are passed simultaneously through the heater thermometer winding 28, a constant direct current being used to indicate the temperature and a variable alternating current being used to energize the winding 28 to provide the desired heat. The circuit is so arranged that very little direct current passes through the alternating current circuit (and vice versa), and the direct current temperature indicating meter 24 is of a type (such as the d'Arsonval type) which is not affected by changes in the alternating current.

In more detail, the first or direct current bridge 25 comprises a pair of leg resistors 26 and 27 which may be of equal value, a single heater-temperature-sensing element 28 and a balancing resistor 29. Resistors 26, 27 and 29 are of low temperature coefficient alloy and the heater-temperature-sensing element 28 is of a high temperature coefficient metal alloy. The direct current bridge 25 is supplied at diametrically opposed terminals 47 and 43 by a convenient direct current source, such as the illustrated six volt battery 31, responsive to movement of the on-off switch 32 to its "on" or closed position. The direct current input to the bridge 25 may be controlled by an adjustable resistance K35, variation of the resistance K35 varying the value of the current input to the bridge to thereby vary the value of current utilized for providing the temperature indications.

Standardization of this value of current is obtained by means of a calibration resistance 34 which is arranged to be inserted in the bridge 25 in lieu of the heater resistance 28 with operation of the switch 33 to its calibrating position. With connection of the calibration resistor 34 in the circuit and the closure of the on-off switch 32, the knob 35 is adjusted to provide the desired standard deflection on the temperature meter 24 which is connected across the first bridge 25 in the conventional manner. Following calibration, switch 33 is moved to the operating position and the heat-temperature sensing member 28 is reconnected in circuit.

The second or alternating current bridge 36 of the arrangement consists of leg resistors 37 and 38 which may be of approximately equal value, heat-temperature sensing element 28, and the balancing resistor 29. The alternating current bridge may be energized by any suitable variable alternating current source, and as herein shown, the source comprises a variable voltage transformer 40 and a step-down transformer 41 which are adapted to be connected over an on-off switch 42 and a conventional connecting plug set 21 to any convenient commercial 110–115 volt, 60 cycle source. The power output of the step-down transformer 41 is applied to diametrically opposed terminals 43 and 44 of the alternating bridge 36. Heating current is passed through both the heater 28 and the resistor 29 in order to minimize the alternating current supplied to the temperature indicating meter 24. In addition the ratio of resistor 37 to resistor 38 may be varied so as to balance the alternating current bridge 36 approximately at the normal working value of the alternating current.

In use following standardization in the manner heretofore described, the switch 33 is moved to its second position to disconnect the calibrating resistance 34 from the direct current bridge 25 and to connect the heat temperature sensing element 28 therein. On-off switch 42 is closed to complete the connection of the alternating current source to the equipment, and the adjustable arm K45 on the variable transformer 40 is moved by operating the knob 45 until the desired temperature is indicated on the temperature meter 24. The temperature of the heater winding 28 is instantaneously indicated on the temperature meter 24 at all times and the value of the current applied to the heater winding is indicated by heat meter 39. Thus, reliable means are provided for applying known heat values to a point area of skin at accurately and critically controlled temperatures.

In one successful apparatus, the values of the elements used were:

R26—R27—R37—R38=15 ohms.
R29=0.50 ohm.
R34=0.55 ohm.
K35=0–6 ohms.
T41=115 to 10 volt step-down transformer.
T40=0–130 volt variable transformer.
D. C. meter 24:0–50 mv.
A. C. meter 39:0–200 ma.
D. C. battery 31:6 volts.

Several specific methods of using the aforedescribed apparatus are set forth in the aforementioned copending application, which is directed to the provision of new and novel methods for determining the presence or non-presence of a malignant disease in a suspected subject. As set forth therein the apparatus is used to provide accurately controlled applications of heat to the skin of the subject to effect a flare response of given characteristics in a given time period. After a series of repetitive tests in which the exact point of the threshold of flare for the subject is determined, the value of the applied temperature at the threshold is measured and compared with the preestablished norms required to effect a flare response for parties not having a malignant disease. As set forth therein, it has been found that clinically normal persons or persons not having a malignant disease have a lower threshold of flare than those parties having a malignant disease, such as cancer. Thus by accurately determining the threshold of flare of the subject and comparing same with the established norms, the existence or non-existence of the disease is readily ascertained.

In a first method set forth therein the heat applicator is energized and the temperature of the applicator is fixed in air. The tip is then applied to the skin and the temperature is maintained constant regardless of the energy required to hold the applicator at a fixed temperature while in contact with the skin. The constant temperature is also maintained regardless of the rate of dissipation of heat caused by the skin temperature or blood flow. A series of tests are made in this manner to determine the threshold whereupon the measurement and comparisons are made.

In a second method, the energy input to the heat applicator is fixed at a given value, the applicator is applied to the skin and that value is maintained without regard to the actual temperature of the applicator tip. The repetitive tests are then made to ascertain the desired threshold in terms of energy.

In a third method, the applicator is applied to the skin and the temperature of the applicator is raised to a desired level within a certain period of time and maintained at that level for the period of application. Repetitive tests are made to determine the exact value of the flare threshold.

Other methods and manner of use of the apparatus in other tests of physiological reactions of the human body may be effected with the aforedescribed apparatus by reason of the critical and accurate control of the equipment; the instantaneous and accurate applied temperature readings which are obtained; and the consistent uniform distribution of the heat of the applicator to the small areas without the usual inaccuracies caused by the heat capacity limitations of other known constructions.

In the second embodiment of the invention shown in Figures 4, 5 and 6, the equipment is arranged to be energized by a self contained D. C. power unit whereby greater flexibility in field use is achieved. The general outward physical appearance of the apparatus is somewhat similar to that of the A. C.-D. C. model in Figure 1, a small probe 14a being mounted at the apex of a triangular "lucite" support 11a and a stabilizing foot member 13a being mounted at the base of the support to serve as a terminal block for the four conductors 15a which extend to the control apparatus. The foot member 13a facilitates handling of the applicator unit in use and serves as a strain relief bushing for the conductors 15a which are moulded in the plastic support 11a and foot member 13a. Two fastening members 51a provide a support for suitable weight members 17a which may be mounted and removed as desired to vary the pressure with which the heat is applied to the subject under test.

A heater winding 54 (Fig. 5) and a temperature sensing element 53 are distributed continuously and uniformly over the surface of the heating element to provide even distribution of the heat and an accurate temperature indicating arrangement. The unit thus provided is extremely small in physical appearance, of light weight, and of a very low heat capacity.

A cross section of the heater-thermometer element, as built into the end of the probe 14a, is shown in Figure 5. On a thin steel base plate 65 the insulated heater 54 and the resistance thermometer winding 53 are wound in close-spaced, side-by-side relation. The dimensions of the plate 65 in one successful embodiment are 0.160 x 0.160 x 0.005 inch, and the wires 53 and 54 are 0.0031" in diameter. The plate 65 is insulated from the wires with baked varnish. The heater winding 54 is made of a high resistance, low temperature coefficient alloy, while the thermometer winding 53 is made of a medium resistance, high temperature coefficient alloy.

Both sides of the plate are completely covered with the fine, closely spaced heater and thermometer wire winding. The whole winding assembly is mounted on the end of the 0.125 diameter round "bakelite" rod 50a having four longitudinal grooves 52a carrying four .016 inch diameter copper lead wires to which the ends of the heater and thermometer windings are soldered. A protective cover plate of 0.001 inch nickel sheet 16a forms the bottom of the element and is secured over the windings and insulated therefrom by baked varnish. The whole element is baked under pressure to reduce the thermal flow resistance between the heating wires and the surface of the nickel cover to a minimum. With this construction, both the heat source and the temperature sensing elements are, in effect, distributed uniformly over the surface of the probe and the readings of the resistance thermometer are extremely reliable.

As stated above, it is desirable to keep the heat capacity of the heater-thermometer element at a minimum so that the heat stored in the probe end at any time will be negligible compared to the heat energy generated electrically in the probe during a given application. It is for this reason that all sizes, wire diameters, etc. are made as small as practicable. The following approximate calculation shows the relation of stored heat to generated heat under average conditions of use.

The total weight of the heater-thermometer assembly is .064 gram. Assuming an average specific heat of the materials (wires, insulation, etc.) of 0.1 cal. per gram, the heat required to raise the probe temperature 20° C. is about 0.14 calories. The heat generated under average conditions of use is approximately 0.07 calorie per second, sufficient to heat the probe through 20° C. (approximately the span between normal skin temperature and the pain threshold) in two seconds. The much smaller temperature fluctuation usually occurring during an application may thus be compensated in tenths of seconds, and within this order of time lag one may assume that the heat energy fed into the skin at any moment is equal to the electrical energy input indicated by the instrument meters.

The heat loss along the "bakelite" support rod 50a, which is about two percent of the usual flow into the skin, could be minimized by the addition of a guard ring heater on the support rod if desired. In comparative tests such modification is not generally required.

The heating and temperature sensing elements in the probe are connected by the four conductors 15a to the control apparatus 12a which, as shown in Figure 4, is outwardly similar to the structure 12 of the first embodiment in Figure 1. The control apparatus 12a however does not require a standardization switch 33 and is interconnected with the applicator by four conductors 15, two of which carry the heating wire 54 to the control apparatus 12a and the other two of which connect the temperature winding 53 to the control apparatus 12a. In other respects the structures are outwardly identical to the structure 12 of the first embodiment.

The circuit for the structure of Figure 4 is shown in Figure 6 and as there illustrated comprises a Wheatstone bridge circuit 60 of the deflection type; that is, the bridge is connected so that the degree of unbalance is indicated directly in a deflection meter 24a which is connected in bridge thereof.

The four arms of the bridge 60 consist of two equal resistors 55, 56, the thermometer winding 53 of the probe, and a balancing resistor 57. The latter is adjusted to be equal in the resistance of winding 53 when it is at the low end of the temperature range over which the probe is operated. For example, if the probe is to be used over the range 40° C. to 60° C., resistor 57 is made equal to the resistance of 53 at 40° C. If then the temperature of the probe surface 16a is 40° C., the bridge 60 is balanced, and the pointer of the meter 24a is at its normal position at the left end of the scale. As the probe temperature rises, the value of resistance 53 increases and the meter 24a shows an increasing deflection which is proportional to the rise of temperature. The deflection is also proportional to the current supplied to the bridge.

The bridge current is adjusted to the proper value to give full scale deflection when the probe is at 60° C. The power source for the bridge comprises a 4.5 volt dry cell battery 58, which is adapted to be connected thereto over a resistor K35a (which is adjusted by movement of the knob 35a) and an indicator meter 23a by the on-off switch 32a.

The power source for the heater winding 54 comprises a 4.5 volt battery 59 which is adapted to be connected in circuit relation with a variable resistor K45a with an indicating meter 39a and the heater winding 54 by a circuit closing and opening switch 42a. If desired, meter 39a may be calibrated to indicate directly the heat energy generated in the probe tip, due allowance being made for the heat produced in the thermometer winding.

In one specific successful embodiment, the values of the elements used were:

| | | |
|---|---|---|
| R55—R56 | ohms | 14 |
| R57 | do | 7 |
| R53 | do | 7–8 |
| R54 | do | 40 |
| K35a | w | 0–5 |
| K45a | w | 0–100 |
| M24a | mv | 50 |
| M39a | ma | 200 |
| M23a | ma | 100 |
| B58 | v | 4.5 |
| B59 | v | 4.5 |

In use, the on-off switch 32a for the bridge circuit is closed and current is supplied by the battery source 58 to the diametrically opposed arms 61 and 62 of the bridge 60. The value of this current is adjusted to a predetermined standard value by means of the rheostat K35a, this standard current being indicated on the D. C. meter 23a.

After the bridge current has been standardized, switch 42a is closed to supply power over conductors 15a to the heater winding 54 in the probe unit 14a to effect the heating thereof. The value of current supplied to the heater winding is determined by the setting of resistor K45a and is indicated at all times by the series-connected meter 39a.

The temperature of the probe contact surface as determined by the probe sensing element 53 is indicated on the D. C. meter 24a.

The equipment may be utilized in physiological tests of many types, several of which are set forth in the copending application heretofore described. A specific set of instructions for use of the equipment in one of these tests is set forth hereat for exemplary purposes.

*Specific list of instructions for use of apparatus in the flare test*

1. Turn on switch 32a and adjust meter 23a with knob K35a to read 80 ma. This standardizes the instrument and should be checked occasionally between measurements.
2. Turn off switch 32a.
3. Place applicator 10a on skin, holding it so that the pressure is purely that of its own weight. If greater pressure is desired, mount heavier weights such as illustrated weight 17a.
4. Turn on switches 32a and 42a and with the help of knob K45a increase the energy input such that after 15 seconds, meter 24a is on 26 mv. (43.8° C.).
5. Control energy with knob 45a to maintain this level of 26 on meter 24a for one minute.
6. Turn off switch 42a, remove applicator 10a from skin.
7. Read and measure the skin flare.

8. If no flare is present, repeat steps 3 to 7, while increasing the temperature reading on meter 24a by steps 1 mv., until a definite flare is observed.

If there is a definite flare, repeat steps 3 to 7, while decreasing the deflections on meter 24a in steps 1 mv. until a threshold is established (a flare with a maximum diameter of 15 mm. or definitely larger than the "red spot" under the applicator is required).

9. Compare readings with established norms.

Calibration

The construction of the probes 14 and 14a described above brings the heater and thermometer windings into very close thermal contact with the probe surface. However, since these windings must necessarily be insulated electrically, there will be a temperature difference between the thermometer element and the probe surface, and this difference will vary when the heat flow from the probe is varied. Before calibrating the thermometer element it was necessary therefore to determine this temperature difference and to compare it with the temperature drop occurring between the surface of the skin and the deeper layers in which the receptors of heat stimuli are located. This could be done directly by noting the change in temperature of the thermometer element with and without a given current flowing through the heater winding, once with the probe immersed in a rapidly stirred thermostated water bath and again with the probe held against the skin. On three subjects tested, it was found that the skin resistance to heat flow varied from 8 to 12 times the internal heat flow resistance of the probe. The latter caused a temperature variation of 0.2° C. to 0.4° C. over the usual range of heater current variation. Since this differential is constant for any one given current value, appropriate small corrections could be made to the observed temperatures.

Calibration was effected in the following manner:

Into the side wall of a water bath an aluminum rod, 5/16 inch diameter by 3 inches long, is fixed with its outer end flush with the wall and its inner end projecting into the water. The outer end of the rod is machined accurately flat. A collar of phenolic insulates the rod thermally from the wall so that its outer end is substantially at the same temperature as the water within the bath. The end of the probe is held in close contact with the outer end of the rod by a spring clamp with a light coating of petroleum jelly between the surfaces to insure good and constant contact. There is no detectable difference between the temperature taken at the end of the rod and with the probe immersed in the water, and this method precludes the possibility of moisture penetration into the probe.

With the bridge supply current maintained at a proper predetermined value, and with heater current at zero, the water temperature is varied in steps of 3 to 4° C. and readings are taken of the water temperature on a 0.1° C. precision thermometer and of the corresponding deflection of the bridge meter 24 or 24a. As explained above, the low end of the temperature scale on this meter may be adjusted to any desired value by adjusting the value of the resistor 57 or 29. The range of the meter, in degrees, may be varied by changing the bridge current as shown on the meter 23a in the embodiment of Figure 4, or as shown by the deflection of meter 24 (with resistor 34 in the circuit) in the embodiment of Figure 1. Increasing this current increases the sensitivity of the bridge, that is, it reduces the range of the meter 24, 24a. In a typical case, with the thermometer resistance of 7.35 ohms at 40° C., and a bridge current of 282 milliamperes, the scale range was 36 to 56° C.

In this case the dissipation of the thermometer winding at the low end of the scales is 0.035 gram calorie per second, and it increases slightly at higher temperatures. The heater winding, resistance 41.1 ohms, provides heat dissipations from zero to a maximum of 0.10 gram calorie per second at a current of 100 milliamperes.

TABLE SHOWING THE MA.-TEMPERATURE EQUIVALENTS OF APPARATUS

| Dial Reading in mv. | Temperature Equivalent in Degrees Centigrade |
|---|---|
| 10 | |
| 15 | 39.4 |
| 20 | 41.4 |
| 21 | 43.4 |
| 22 | 43.8 |
| 23 | 44.2 |
| 24 | 44.6 |
| 25 | 45 |
| 26 | 45.4 |
| 27 | 45.8 |
| 28 | 46.2 |
| 29 | 46.6 |
| 30 | 47 |
| | 47.4 |

The foregoing table illustrates the temperature of the applicator with a given reading on the temperature meter 24a of one specific set of apparatus.

Conclusion

The heat applicator apparatus in the several embodiments shown heretofore is especially adapted to apply closely measured heat quantities at known temperatures to a minute area in a manner which should prove extremely valuable to persons in medical research. The inherent accuracy and reliability of the apparatus, attributable both to the new and novel applicator unit and the improved circuit control means, lends the equipment to especially successful use in the scientific analysis of various physiological reactions. Further, the well designed control arrangement provides a unit which is convenient to use and easy to handle.

The integral structure of the heater winding and the temperature sensing means provides readings of increased sensitivity and renders practical the drawing of closer lines of differentiation in measured response than have been heretofore obtainable with known types of instruments.

The novel probe unit which provides uniform heat distribution over a substantially point contact area and also provides reliable indication of the temperature of the contact surface insures the transmission of competent and reliable in formation to the user at all times. The simple, rugged and compact nature of the unit greatly facilitates the application of known and controlled temperatures above ambient temperature in very small spaces. Further, such information is extremely accurate and reliable by reason of the minimization of the heat capacity limitations of the probe which is effected by the structure of the disclosure. The direct reading nature of the indications which is rendered possible by the arrangement make possible the use of the equipment in instances where the temperature has to be varied rapidly and where adjustments must be made to compensate for fluctuations of temperature or heat flow in the biological material. This inherent flexibility of the equipment adapts the apparatus for use in many fields and should facilitate the exploratory venture of research in many branches of science.

The control apparatus which has been designed for use with the heat-stimulation applicator is also of a compact, reliable, flexible, stable and portable nature. Further, the equipment is simple in its connections and arrangement whereby operation of the equipment is made extremely convenient. The novel circuit arrangement in the first embodiment which is adapted to supply a single winding element for both the heat applicator and temperature sensing element provides a unit which is extremely compact, rugged and reliable and which insures greater accuracy and reliability in use. The manner in which the second embodiment is energized from an entirely self contained power pack provides a unit which is extremely portable and convenient in field use. Both embodiments of the invention are an aid to the advancement of the fields of research and especially to that field in the medical art.

These and other features of the invention which are believed to be new are now set forth in the following claims.

I claim:

1. An apparatus for supplying closely measured heat quantities at known temperatures to a small area comprising a heat applicator unit having an applicator element for applying heat to a comparatively small area including temperature sensing means and heating means, said temperature sensing and heating means having a surface which extends substantially coextensively with the applicator element of said unit, support means for mounting said temperature sensing and heating means with said coextensive surface in uniform proximity at all points with the applicator portion of said unit, control means for connecting said heater and temperature sensing means to an energizing source of power, and adjusting means for controlling same in its connection thereto.

2. An apparatus for applying closely measured controlled heat quantities at known temperatures to a minute area comprising a heat applicator unit having a tip portion for applying heat to a small area and including heater and temperature sensing means, control means for connecting said heater and temperature sensing means to an energizing source of power including intensity control means for adjusting the power supplied to said heater unit to vary the heat output of said applicator, and temperature indicating means connected to said temperature sensing means for automatically providing direct-reading, instantaneous indications of the variations of temperature effected.

3. An apparatus for use in applying closely measured and controlled heat quantities to a given small area comprising a small area heat applicator having an applicator portion and temperature sensing and heater means, support means for supporting said temperature sensing and heater means in uniformly proximate relation with substantially all points of said applicator portion control means for connecting said temperature sensing and heater means to an energizing source of power and controlling same in its connections thereto, and adjustable weight means for varying the pressure of application of the applicator in its contact with the point area during the use thereof.

4. An apparatus for applying heat to small areas of the skin in the determination of the physiological skin reactions of the subject comprising a heat appplicator unit having a total heat applicator surface area of approximately 16 square mm., temperature sensing and heater means having a like co-extensive surface area for heating and measuring the heat value of said applicator surface, means for supporting said temperature sensing and heater surface in equidistant relation with substantially all points of said heat applicator area, and control means for connecting said temperature sensing and heater means to an energizing source of power and controlling same in its connections thereto.

5. An apparatus for applying heat in the determination of physiological skin reactions of a subject comprising a heat applicator unit for applying heat to a minute area of skin comprising a probe member having a base skin contacting element, heating and temperature sensing elements uniformly distributed on a single member in an interspersed relation, means for supporting said single member adjacent said base contacting element, control means for connecting said temperature sensing and heater means to an energizing source of power, and regulating means controlling same in its connection thereto.

6. An apparatus for applying heat to a subject for determining the physiological skin reactions thereof including a heat applicator unit for applying heat to a minute area of skin comprising a triangular support member, a foot member attached at the base of said triangle to provide a stable holding means for the user thereof, a probe unit supported at the apex of said triangular support member having a base portion adapted for skin contacting purposes, temperature sensing and heater means supported in close contact with said probe base portion, control means for connecting said temperature sensing and heater means to an energizing source of power and controlling same in its connections thereto, and conductor means for connecting said probe to said control means moulded in said triangular support for the portion of its length which extends simultaneously with said support, whereby said support forms a strain relief member for said conductors.

7. An apparatus for use in the application of closely measured heat quantities to minute areas comprising a heat applicator unit including a single-winding temperature sensing and heater member, control means for connecting said single temperature sensing and heater member to a first and a second energizing source, and regulator means for controlling the power supplied thereto by said first and said second sources respectively to thereby control same in its heating and measuring functions.

8. An apparatus for use in determining the physiological skin reactions of the subject comprising a heat applicator unit for applying heat to a minute area of skin including an applicator element, a temperature sensing member, a heater member, means for mounting said temperature sensing and heater members in interspersed relation with each other and in substantially equidistant relation with all points of said heat applicator element, and control means for connecting said heater means to a controlled variable source of potential and for connecting said temperature sensing unit to a direct reading temperature meter to provide indications of the temperature of said skin contacting area of said heat applicator unit.

9. An apparatus for use in determining the physiological skin reaction of a subject comprising a heat applicator unit including an applicator element for applying heat to the skin and including a temperature sensing element and a heater element mounted in superimposed and coextensive relation with said applicator element, and control means for connecting said temperature sensing element and said heater means to an energizing source of power and controlling same in its connection thereto, said control means comprising adjustable means for varying the value of the power supplied to said heater unit and the heat output of said applicator, a Wheatstone bridge including said temperature sensing element as a first leg thereof and a fixed value resistor as a second leg thereof which is equal in value to the resistance of the temperature sensing element at the low end of the range of the unit, a third and fourth fixed equal resistor comprising the third and fourth legs of the bridge, and a galvanometer connected in said bridge for automatically providing an instantaneous, direct reading indication of variations of the value of resistance of the temperature sensing element in the first leg thereof as the temperature of the heat applicator skin contacting surface is varied.

10. An apparatus as set forth in claim 9 in which said heater element comprises a winding of low temperature coefficient alloy and said temperature sensing means comprises a winding of high temperature coefficient material.

11. An arrangement as set forth in claim 9 which includes an adjustable power supply for varying the power supply to the Wheatstone bridge in standardizing said direct-reading equipment prior to the use thereof.

12. An apparatus for use in determining the physiological skin reaction of a subject comprising a heat applicator unit for applying heat to a minute area on the skin of the subject, a single temperature sensing and heater unit mounted on said apparatus comprising a winding of a material having a high temperature coefficient of resistance, and control means for connecting said single wire temperature sensing and heater means to a plurality of energizing sources and controlling same in its connections thereto, said control means comprising an alternating current bridge circuit and a direct current bridge circuit, said circuits having at least one common leg, variable means for adjusting the alternating current supplied to said alternating current bridge to vary the electrical energy applied to said applicator, and direct reading indicating means connected to said direct current bridge for indicating the temperature of said applicator surface at all times.

13. An apparatus for use in determining the physiological skin reactions of a subject comprising a heat applicator unit for applying heat to a small area of skin, a single temperature sensing and heater means mounted on said applicator, and control means for connecting said temperature sensing and heater element to an energizing source and controlling same in its connection thereto, said control means comprising conductor means for connecting the control apparatus to an alternating current source and a direct current source of potential, adjustable means for applying variable values of alternating current from said alternating current source to said heater winding to vary the heat output of said applicator, and a direct current indicator meter connected in bridge relation with said winding to indicate variations in the temperature as determined by said winding.

14. An apparatus for use in determining the physiological skin reaction of a subject comprising a heat applicator unit for applying heat to a small area of the skin of the subject, a single temperature sensing and heater element mounted on said apparatus comprising a winding of a material having a high temperature coefficient of resistance, and control means for connecting said combination temperature sensing and heater unit to a plurality of energizing sources and controlling same in its connections thereto, said control means comprising an alternating current bridge and a direct current bridge having said temperature sensing and heating element connected in one leg of each of said bridges, variable means for adjusting the alternating current supply to said alternating current bridge to vary the heat applied to said applicator by said heating element, temperature indicating means connected to said direct current bridge to indicate variations in value of applicator temperature as detected by said temperature sensing winding, and adjusting means for varying the potential supply to said direct current bridge to a given value prior to use of the equipment.

15. An apparatus for use in determining the physiological skin reactions of a subject comprising a heat applicator unit for applying heat to a small area of skin, a single winding temperature sensing and heater means for said applicator, and control means for connecting said temperature sensing and heater means to an energizing source and controlling same in its connection thereto, said control means comprising an alternating current bridge including two fixed resistors, said temperature sensing and heater element, and a balancing resistor, adjustable means for applying variable values of alternating current thereto to vary the value of current applied to the winding of said applicator, a direct current bridge comprising two fixed resistors, said temperature sensing and heater element and said balancing resistor for determining the temperature of the heat applicator unit at all times; and adjustable means for supplying a constant value of direct current potential to said direct current bridge as determined prior to the use thereof.

16. An apparatus as set forth in claim 15 in which said single temperature sensing and heater element is a winding of high temperature coefficient resistant metal and said other resistances in said bridges are windings of a metal of a low temperature coefficient of resistance.

17. An apparatus for use in determining physiological skin reactions of a subject comprising a heat applicator unit for applying heat to a minute area of skin having an elongated support member having sides of insulating material and an end portion terminating said sides comprised of a heat applicator member of a comparatively small area, temperature sensing and heater means coextensive in area with said member, means for mounting said temperature sensing and heating means in superimposed layer relation with said heat applicator member, and control means for connecting said temperature sensing and heating means of said applicator to an energizing source of power to provide temperature variable over a range of at least 30° C. at the skin contacting surface of said applicator.

18. A probe member of a minimum heat capacity for use in applying controlled and measured quantities of heat to a minute area comprising a support member having sides of an insulating material, a contacting surface which terminates and is supported by said sides at the end thereof, a heater and a temperature sensing element, and means for supporting said heater and temperature element in uniform adjacent proximity with said end surface.

19. A probe member of a minimum heat capacity for use in applying controlled and measured quantities of heat to a minute area comprising a support member having sides of an insulating material, a contacting surface which terminates and is supported by said sides at the end thereof, a heater and a temperature sensing element, said contacting surface and said heater and temperature sensing element being baked under pressure to reduce the thermal flow resistance therebetween.

References Cited in the file of this patent

UNITED STATES PATENTS

| 1,190,978 | Bliss | July 11, 1916 |
| 2,583,561 | General | Jan. 29, 1952 |

OTHER REFERENCES

Stoelting Catalogue, copyright 1930, page 51, item 18222. (Copy in Division 36.)